Patented Sept. 10, 1940

2,214,358

UNITED STATES PATENT OFFICE 2,214,358

HEAT INSULATING FOAM AND METHOD OF USING SAME

Robert C. Williams, Columbus, Ohio, assignor to The Ironsides Company, Columbus, Ohio, a corporation of Ohio No Drawing. Application April 26, 1937, Serial No. 139,008

8 Claims. (Cl. 106—18)

The present invention relates to an improved foam or foam substance which is adapted for use directly and without admixture with other materials in heat insulating capacities, an object of the invention being to provide a foam or foam substance of high fluidity which may be readily and conveniently introduced into a walled space or chamber and upon evaporation of its more readily volatilizable ingredients will harden or set to produce a body or mass composed of a multitude of thin-walled cells or pores which render the material highly efficient in resisting heat transmission through the same.

Thermal insulation now in general use for insulating the side walls or roofs of buildings, and in other capacities, comprises pre-formed materials which require considerable labor and care in effecting their proper application, with the result that the cost of such materials and the labor costs of installing the same militate against their wide use.

It is therefore another object of the invention to provide a cheaper and lighter weight insulating material in the nature of a stabilized foam composed of relatively inexpensive ingredients which when in its initially prepared form possesses such a high degree of fluidity that it may be readily pumped or otherwise introduced into the space formed between the walls of a building and which will set in situ to fill the wall space with an extremely light weight body or mass of a water resisting and highly cellular nature.

I am aware of the fact that it has been proposed hitherto to produce foams for incorporation in ceramic or cementitious slurries for the purpose of rendering such inorganic materials porous or cellular. The present invention, however, is distinguished from such prior foams by the fact that it forms of itself a vesiculated heat insulating body, thereby producing an insulation characterized by its extreme lightness in weight and low costs.

In accordance with the preferred form of the present invention, my improved foam or foam substance is produced by a heated mixture comprising a fatty acid, water, a volatile alkali, and a metal oxide. I have obtained satisfactory results with the use of the following formula:

| | Per cent |
|---|---|
| Stearic acid | 22.5 |
| Water | 67.6 |
| Ammonia | 6.3 |
| Zinc oxide | 3.6 |

In preparing these materials, the stearic acid together with the water content are slowly heated to a temperature of the order of 212° F. and the ammonia is then added and later the zinc oxide. Heating of the mixture is continued until a substantial percentage of zinc stearate is formed. Ammonia volatilizes somewhat and water lost by evaporation should be replaced. This mixture is suitably agitated either by mechanical means or by passing air or steam upwardly through the heated mixture. The materials foam readily when beaten and possess such fluidity that after being mixed and allowed to cool, the same may be pumped or otherwise forced into the wall spaces of a building capable of receiving a heat insulating material. The apparatus for mixing and heating the materials may be mounted on a portable truck in order that the foam may be conveniently produced at the site of use. It is of course within the scope of the invention to effect the molding of the foam in other types of forms or molds.

Following the evaporation of the water and ammonia, the foam sets or hardens, producing a light weight mass composed of a multitude of small closed cells which under the weight of said mass permanently retain their form. A unit of the foam contains a great number of cells, most of which are closed, the said cells being separated from each other by walls of the base substance, which walls are characterized by their extreme thinness.

The foamed product has a specific gravity varying between .0122 and .064 and a corresponding approximate weight of .75 pound per cu. ft. for the example of lower weight. I have found the proportions of the ingredients set forth in the above formula to be somewhat critical in securing an end product of desired properties, and have observed that an excess of alkalinity in the composition tends to render the same too brittle whereas a decrease in the normal alkalinity tends to cause precipitation of zinc stearate. The product shrinks very little as a result of drying and retains its desired cellular formation.

While stearic acid has been given as a preferred base ingredient, other fatty acids or their resulting soaps may be substituted in lieu thereof. Likewise, volatile alkalines other than ammonia may be used, such as the amines or ammonium chloride. I have found zinc oxide to be a preferred stiffening agent although it is within the scope of the invention to further reenforce the cell walls or the stability of the product by the incorporation of a light organic material such as obtained from certain sea weeds.

While a particular embodiment of the invention has been set forth, I do not wish to limit myself precisely to these details, since the same are subject to considerable variation without departing from the spirit of the invention as defined in the appended claims.

What is claimed is:

1. Heat insulation comprising a light weight highly cellular mass consisting of a fatty acid and zinc stearate.

2. Heat insulation comprising a foam-like vesicular mass consisting of stearic acid and zinc stearate.

3. A stable heat insulating foam consisting of stearic acid, zinc oxide, and a volatile alkali.

4. A stable heat insulating foam composed principally of zinc stearate.

5. A stable heat insulating foam comprising a light weight mass composed of a multitude of small closed cells which under the weight of said mass permanently retain their form, the cells being separated from each other by extremely thin walls consisting principally of zinc stearate.

6. A composition for producing a stable heat insulating foam consisting of the following ingredients in substantially the percentages set forth:

| | Per cent |
|---|---|
| Stearic acid | 22.5 |
| Water | 67.6 |
| Ammonia | 6.3 |
| Zinc oxide | 3.6 |

7. A stable heat insulating foam comprising a light weight mass composed of a multitude of small closed cells which under the weight of said mass permanently retain their form, the cells being separated from each other by extremely thin walls consisting principally of zinc stearate, the walls of said cells being reenforced by the incorporation in said mixture of sea weed organic material.

8. A stable heat-insulating foam consisting substantially of a zinc fatty acid soap.

ROBERT C. WILLIAMS.